(12) United States Patent
Ikenoue et al.

(10) Patent No.: US 11,865,448 B2
(45) Date of Patent: *Jan. 9, 2024

(54) INFORMATION PROCESSING APPARATUS AND USER GUIDE PRESENTATION METHOD

(71) Applicant: Sony Interactive Entertainment Inc., Tokyo (JP)

(72) Inventors: Shoichi Ikenoue, Chiba (JP); Tatsuo Tsuchie, Tokyo (JP); Tetsugo Inada, Tokyo (JP); Masaki Uchida, Tokyo (JP); Hirofumi Okamoto, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/954,876

(22) Filed: Sep. 28, 2022

(65) Prior Publication Data

US 2023/0014603 A1 Jan. 19, 2023

Related U.S. Application Data

(63) Continuation of application No. 17/168,336, filed on Feb. 5, 2021, now Pat. No. 11,484,792, which is a
(Continued)

(30) Foreign Application Priority Data

Jan. 20, 2016 (JP) .................................. 2016-009002

(51) Int. Cl.
*A63F 13/53* (2014.01)
*G09G 5/00* (2006.01)
(Continued)

(52) U.S. Cl.
CPC ............ *A63F 13/53* (2014.09); *G02B 27/017* (2013.01); *G06F 3/011* (2013.01); *G06F 3/012* (2013.01);
(Continued)

(58) Field of Classification Search
CPC . A63F 13/53; G06T 7/70; G06T 19/00; G06T 19/003; G06T 7/50;
(Continued)

(56) References Cited

U.S. PATENT DOCUMENTS 6,280,323 B1  8/2001  Yamazaki
7,330,197 B2  2/2008  Kobayashi
(Continued)

FOREIGN PATENT DOCUMENTS

CN  104750249 A  7/2015
EP     1538512 A3  1/2007
(Continued)

OTHER PUBLICATIONS

International Search Report for corresponding PCT Applicaiton No. PCT/JP2017/001041, 4 pages, dated Feb. 28, 2017.
(Continued)

*Primary Examiner* — Werner G Garner
(74) *Attorney, Agent, or Firm* — Matthew B. Dernier, Esq.

(57) ABSTRACT

Methods and apparatus provide for acquiring position information about a head-mounted display; performing information processing using the position information about the head-mounted display; generating and outputting data of an image to be displayed as a result of the information processing; and generating and outputting data of an image of a user guide indicating position information about a user in a real space using the position information about the head-mounted display, where the generating and outputting data
(Continued)

of the image of the user guide includes determining whether to display the user guide in response to certain criteria.

25 Claims, 11 Drawing Sheets

Related U.S. Application Data continuation of application No. 15/781,764, filed as application No. PCT/JP2017/001041 on Jan. 13, 2017, now Pat. No. 10,974,148.

(51) Int. Cl.
| | | |
|---|---|---|
| *G06F 3/01* | (2006.01) | |
| *G02B 27/01* | (2006.01) | |
| *G06T 19/00* | (2011.01) | |
| *G06T 7/70* | (2017.01) | |
| *G06T 7/50* | (2017.01) | |

(52) U.S. Cl.
CPC .............. *G06T 7/70* (2017.01); *G06T 19/00* (2013.01); *G06T 19/003* (2013.01); *G09G 5/00* (2013.01); *G06T 7/50* (2017.01); *G06T 2207/10028* (2013.01)

(58) Field of Classification Search
CPC ........ G06T 2207/10028; G02B 27/017; G06F 3/011; G06F 3/012; G09G 5/00
See application file for complete search history.

(56) References Cited

U.S. PATENT DOCUMENTS

| | | | |
|---|---|---|---|
| 9,245,389 | B2 | 1/2016 | Sako |
| 9,599,818 | B2 | 3/2017 | Yamagishi |
| 9,607,015 | B2 | 3/2017 | Gao |
| 9,784,972 | B2 | 10/2017 | Aratani |
| 10,134,189 | B2 | 11/2018 | Yamamoto |
| 2005/0123171 | A1 | 6/2005 | Kobayashi |
| 2013/0093787 | A1 | 4/2013 | Fulks |
| 2013/0286004 | A1 | 10/2013 | McCulloch |
| 2013/0328928 | A1 | 12/2013 | Yamagishi |
| 2014/0160129 | A1 | 6/2014 | Sako |
| 2015/0084142 | A1 | 3/2015 | Nagase |
| 2015/0094142 | A1 | 4/2015 | Stafford |
| 2016/0078641 | A1 | 3/2016 | Aratani |
| 2016/0140768 | A1 | 5/2016 | Sako |
| 2016/0379413 | A1 | 12/2016 | Yamamoto |

FOREIGN PATENT DOCUMENTS

| | | |
|---|---|---|
| JP | 2005165848 A | 6/2005 |
| JP | 2007156561 A | 6/2007 |
| JP | 2013257716 A | 12/2013 |
| JP | 2014115457 A | 6/2014 |
| JP | 5580855 B2 | 8/2014 |
| JP | 5777786 B1 | 9/2015 |
| JP | 7085578 B2 | 6/2022 |
| WO | 2015111283 A1 | 7/2015 |

OTHER PUBLICATIONS

International Preliminary Report on Patentability and Written Opinion for corresponding PCT Application No. PCT/JP2017/001041, 14 pages, dated Aug. 2, 2018.
Supplementary European Search Report for corresponding EP Application No. 17741312, 9 pages, dated Jul. 19, 2019.
Thierry Duval et al: "Embedding the features of the users' physical environments to improve the feeling of presence in collaborative Virtual Environments," Cognitive Info Communications (COGINFOCOM). 2012 IEEE 3rd International Conference on IEEE., 6 pages, dated Dec. 2, 2012. (See Non-Pat. Lit. #3).
"How to get real camera position in VR mode?", Jun. 25, 2015, U E4 AnswerHub, available at «https://answers.unrealengine.com/questions/243325/how-to-get-real-camera-position-in-vr-mode.html». (Year: Jan. 2015).
Summons to attend oral proceedings for corresponding EP Application No. 17741312.7, 10 pages, dated Feb. 11, 2021.
Tobian Hans Hollerer, "User Interfaces for mobile augmented reality systems" Columbia University, 238 pages, https://search.proquest.com/docview/305208885, Jan. 1, 2004 (submitting 22 pages of preliminary information and pp. 1-97) previously cited Feb. 22, 2021 (See Non-Pat. Lit. #6).
Tobian Hans Hollerer, "User Interfaces for mobile augmented reality systems" Columbia University, 238 pages, https://search.proquest.com/docview/305208885, Jan. 1, 2004 (submitting pp. 98-216) (See Non-Pat. Lit. #6).
Notice of Reasons for Refusal for corresponding JP Application No. 2020-040691, 12 pages, dated Feb. 4, 2021.
The First Office Action for corresponding CN Application No. 201780006705.6, 25 pages, dated Jun. 2, 2021.
Thierry Duval, et al., "Embedding the Features of the Users' Physical Environments to Improve the Feeling of Presence in Collaborative Virtual Environments" CogInfo 2012, 3rd IEEE International Conference on Cognitive Info communications, 6 pages, Dec. 2-5, 2012. (See Non-Pat. Lit. #10).
Decision to Grant a Patent for corresponding JP Application No. 2020-040691, 4 pages, dated Apr. 27, 2022.
Notice of Reasons for Refusal for corresponding JP Application No. JP2022090423, 6 pages, dated Aug. 21, 2023.

INFORMATION PROCESSING APPARATUS AND USER GUIDE PRESENTATION METHOD

CROSS REFERENCE TO RELATED APPLICATIONS

This is a continuation application of U.S. patent application Ser. No. 17/168,336, accorded a filing date of Feb. 5, 2021, allowed; which is a continuation application of U.S. patent application Ser. No. 15/781,764, accorded a filing date of Jun. 6, 2018 (U.S. Pat. No. 10,974,148, issued Apr. 13, 2021); which is a national phase application of International Application No. PCT/JP2017/001041, filed Jan. 13, 2017; which claims priority to Japanese Application No. JP 2016-009002, filed Jan. 20, 2016; and the entire disclosures of which are hereby incorporated by reference.

TECHNICAL FIELD

The present invention relates to an information processing apparatus that performs information processing on the basis of captured images, as well as to a user guide presentation method carried out by the information processing apparatus.

BACKGROUND ART

Today, video games may be played by a user watching a display screen of a head-mounted display (called the HMD hereunder) worn on the head and connected to a game machine (e.g., see PTL 1). If the position and posture of the user's head are acquired so that images of a virtual world are presented to the user in such a manner that the field of view is varied in accordance with the acquired direction of the user's face for example, it is possible to produce a situation where the user feels as if he or she is actually in the virtual world. Generally, the user's position and posture are acquired through analysis of visible or infrared light images captured of the user or on the basis of measurements taken by motion sensors inside the HMD, for example.

CITATION LIST

Patent Literature

[PTL 1] Japanese Patent No. 5580855

SUMMARY

Technical Problem

The techniques for performing some kind of information processing based on captured images are predicated on the assumption that a target object such as a user is within the angle of view of a camera. Depending on the nature of information processing, areas where the user is preferably located may be limited. However, because the user wearing the HMD is unable to view the outside world, the user may get disoriented or may be immersed in the ongoing game so much that the user may move to an unexpected place in the real space without noticing it. Such eventualities may lead to worsening of the accuracy of information processing or to its disruption as well as collisions with some other objects. Without removing the HMD, it is difficult for the user to find out the cause of the irregularities. If these conditions frequently occur, they would detract from the world view of the virtual space provided by use of the HMD.

The present invention has been made in view of the above circumstances. An object of the invention is therefore to provide techniques for enjoying the world represented by the HMD with a minimum of burden.

Solution to Problem

According to one aspect of the present invention, there is provided an information processing apparatus including a position information acquiring section configured to acquire position information about a head-mounted display, an information processing section configured to perform information processing using the position information about the head-mounted display, an output data generating section configured to generate and output data of an image to be displayed as a result of the information processing, and a user guide generating section configured to generate and output data of an image of a user guide indicating position information about a user in a real space using the position information about the head-mounted display.

According to another aspect of the present invention, there is provided a user guide presentation method for use with an information processing apparatus. The method includes a step of acquiring position information about a head-mounted display, a step of performing information processing using the position information about the head-mounted display, a step of generating and outputting data of an image to be displayed as a result of the information processing, and a step of generating and outputting data of an image of a user guide indicating position information about a user in a real space using the position information about the head-mounted display.

Incidentally, if other combinations of the above-outlined composing elements or the above expressions of the present invention are converted between different forms such as a method, an apparatus, a system, a computer program, and a recording medium with a computer program recorded thereon, they still constitute an effective embodiment of this invention.

Advantageous Effect of Invention

According to the present invention, the user wearing the HMD can enjoy the world represented thereby with a minimum of burden.

DESCRIPTION OF EMBODIMENT

Figure 1:
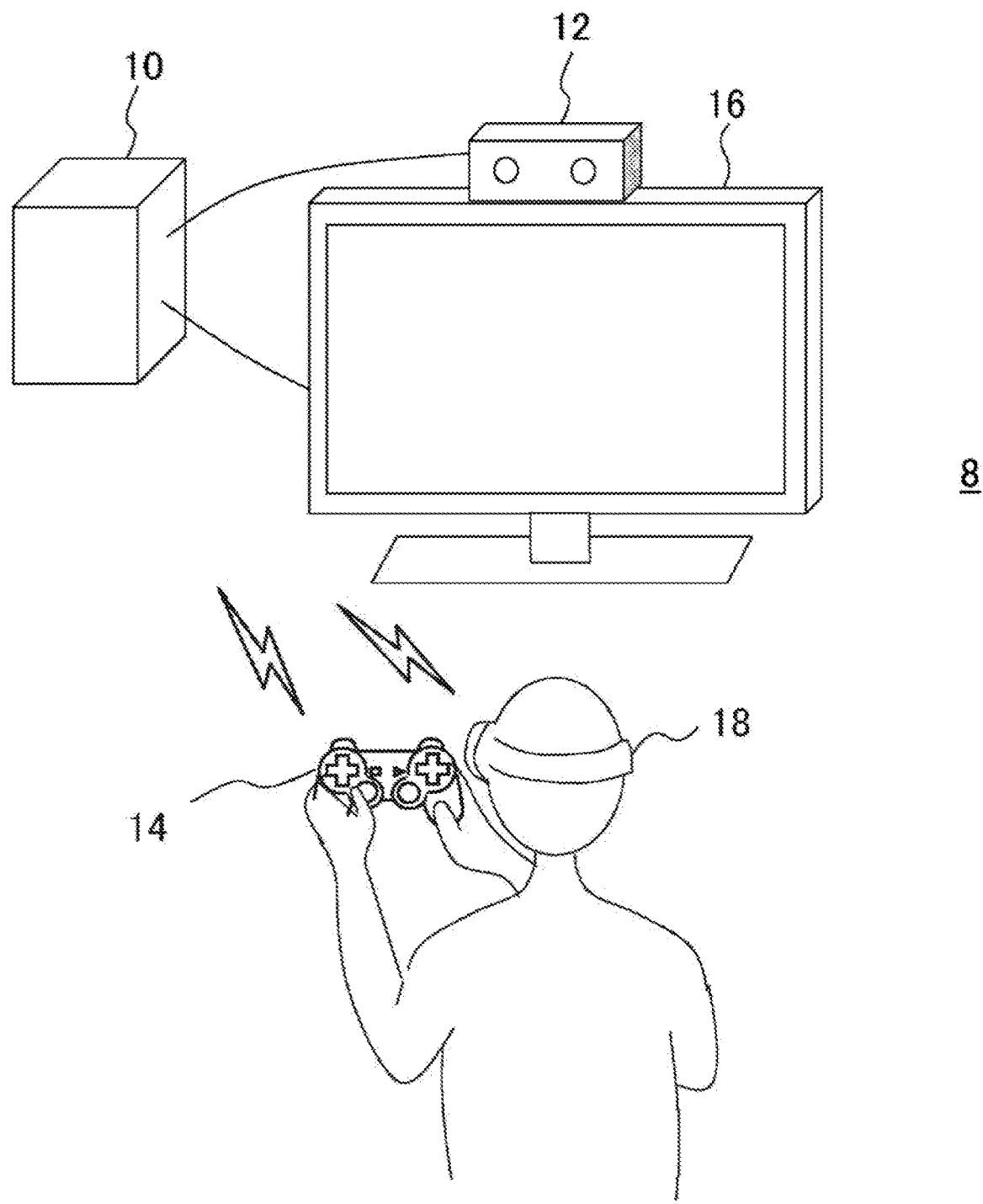
FIG. 1 is a schematic diagram depicting a typical configuration of an information processing system to which one embodiment of the present invention may be applied.

FIG. 1 depicts a typical configuration of an information processing system to which one embodiment of the present invention may be applied. An information processing system 8 includes an imaging device 12 that images a target object, an information processing apparatus 10 that performs information processing on the basis of captured images, a flat-screen display 16 and an HMD 18 for displaying the image obtained as a result of the information processing, and an input device 14 operated by the user.

The information processing apparatus 10 may be connected with the imaging device 12, input device 14, flat-screen display 16, and HMD 18 either by cable or by known wireless communication technology such as Bluetooth (registered trademark). Depending on the information processing carried out by the information processing apparatus 10, the flat-screen display 16 may be omitted. The external shapes of the apparatus and devices are not limited to what is illustrated. Two or more of such devices may be integrated in a single device or apparatus. For example, the information processing apparatus 10, input device 14, and flat-screen display 16 may be implemented in a mobile terminal.

The imaging device 12 includes a camera that images the target object such as the user at a predetermined frame rate and a mechanism that generates output data of captured images by performing known processes such as demosaicing on an output signal from the camera, before sending the output data to the information processing apparatus 10. A camera is provided including visible light sensors used in common digital cameras or digital video cameras, such as charge-coupled device (CCD) sensors or complementary metal oxide semiconductor (CMOS) sensors. The imaging device 12 may include either a single camera or a so-called stereo camera that has two cameras disposed right and left at a known distance apart as illustrated.

As another alternative, the imaging device 12 may be formed by combining a monocular camera with a device that emits reference light such as infrared rays to the target object and measures reflected light therefrom. Where the stereo camera or the reflected light measuring mechanism is provided, it is possible to find the position of the target object in a three-dimensional real space. This allows the information processing apparatus 10 to perform information processing or the display device to give image display in a more diverse manner. It is well known that the stereo camera determines the distance from the camera to the target object by resorting to the principle of triangulation using stereoscopic images captured from right and left points of view. Also well known are the techniques for determining the distance from the camera to the target object through measurement of reflected reference light on a time-of-flight (TOF) basis or by use of a pattern projection method.

What follows is primarily a description of the manner in which the imaging device 12 captures a stereoscopic image. However, this is not limitative of how the present invention is practiced. At least one camera need only be included in the imaging device 12. The information processing apparatus 10 performs necessary information processing using the data sent from the imaging device 12 so as to generate output data such as image and audio data. The content of the processing carried out by the information processing apparatus 10 is not limited in particular and may be determined as needed depending on the functions, applications, or electronic content desired by the user for example.

The information processing apparatus 10 typically performs known processes such as face detection and tracking on the captured image in order to advance a video game in which appears a character reflecting the movement of the user as the target object or to convert the user's movement into command input for information processing, for example. At this time, markers attached to the input device 14 may be used for acquisition of the movement of the input device 14. Also, multiple markers attached to the external surface of the HMD 18 may be tracked so as to identify the position and posture of the user's head wearing the HMD 18. The HMD 18 may then be caused to display a virtual world as seen from the point of view being moved in keeping with the identified position and posture of the user's head. The output data generated by the information processing apparatus 10 is transmitted at least to the HMD 18.

The HMD 18 is a display device that presents the user wearing it with images on a display panel such as an organic electroluminescence (EL) panel positioned before the user's eyes. For example, parallax images captured from right and left points of view are generated and displayed on a right and a left display region bisecting the display screen so that the images may be viewed stereoscopically. However, this is not limitative of how the present invention is practiced. For example, a single image may be displayed over the entire display screen. Furthermore, the HMD 18 may incorporate speakers or earphones that output sounds to the positions corresponding to the user's ears.

The flat-screen display 16 may be a television set equipped with a display unit that outputs two-dimensional images and speakers that output sounds. For example, the flat-screen display 16 may be a liquid crystal display television set, an organic EL television set, a plasma display television set, or a personal computer (PC) display unit. Alternatively, the flat-screen display 16 may be a display unit of a tablet terminal or a mobile terminal equipped with speakers. The input device 14, when operated by the user, receives requests to start or end processing, to select functions, or to input various commands for example, and supplies the received requests as electrical signals to the information processing apparatus 10.

The input device 14 may be implemented as one or a combination of common input devices such as a game controller, a keyboard, a mouse, a joystick, and a touch pad on the display screen of the flat-screen display 16. The input device 14 may also be equipped with a light-emitting marker arrangement made up of one or a set of light-emitting elements emitting light in a predetermined color. In this case, if the information processing apparatus 10 tracks the movement of the markers using captured images, the movement of the input device 14 itself may be regarded as the user's operation. As another alternative, the input device 14 may be constituted solely by a light-emitting marker and a gripping mechanism attached thereto.

Figure 2:
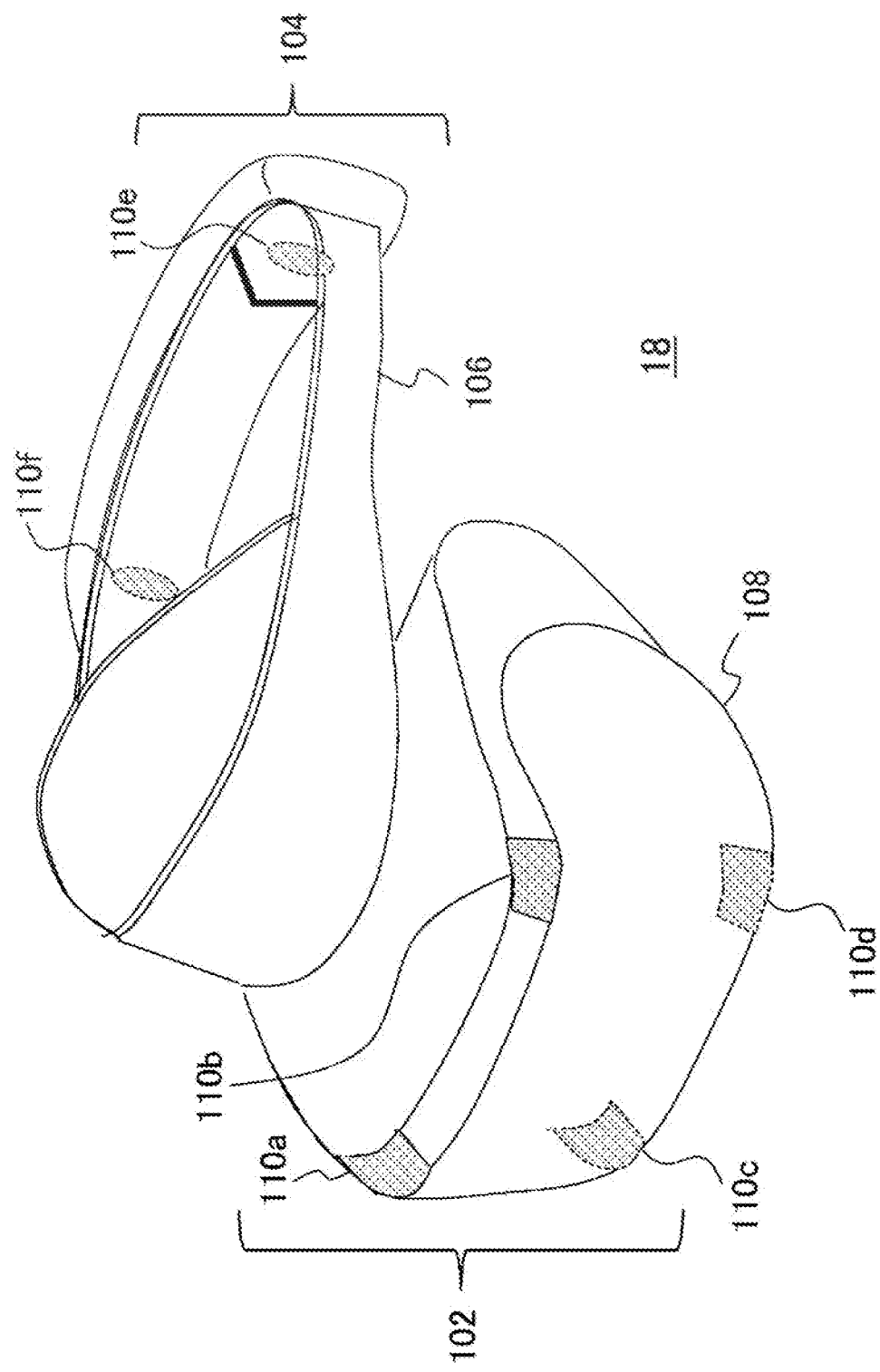
FIG. 2 is a schematic diagram depicting a typical external shape of the HMD of the embodiment.

FIG. 2 depicts a typical external shape of the HMD 18. In this example, the HMD 18 is made up of an output mechanism section 102 and a wearing mechanism section 104. The wearing mechanism section 104 includes a wearing band 106 that implements fixing of the apparatus by the user wearing the wearing band 106 in such a manner that it surrounds the user's head. The wearing band 106 is made of such materials or structured in such a manner that the length of the band is adjustable to accommodate the perimeter of each user's head. For example, the wearing band 106 may be made of an elastic body or may utilize buckles and gears for length adjustment.

The output mechanism section 102 includes a housing shaped to cover both eyes when the user wears the HMD 18. Inside the housing 108 is a display panel facing straight at the user's eyes. Light-emitting markers 110a, 110b, 110c, and 110d are attached to the external surface of the housing 108. Although the number of light-emitting markers or their arrangement is not limited in particular, this embodiment has the light-emitting markers attached to four corners of the housing front of the output mechanism section 102.

Light-emitting markers 110e and 110f are further attached to both sides of the wearing band 106 at the back thereof. With the light-emitting markers arranged in this manner, a moving user facing sideways or backwards relative to the imaging device 12 can still be identified on the basis of the number and the positional relations of light-emitting markers in the captured image. It is to be noted that the light-emitting markers 110c and 110d under the output mechanism section 102 and the light-emitting markers 110e and 110f outside the wearing band 106 are actually invisible from the point of view of FIG. 2, so that the contours of these light-emitting markers are indicated by dotted lines in the illustration.

Figure 3:
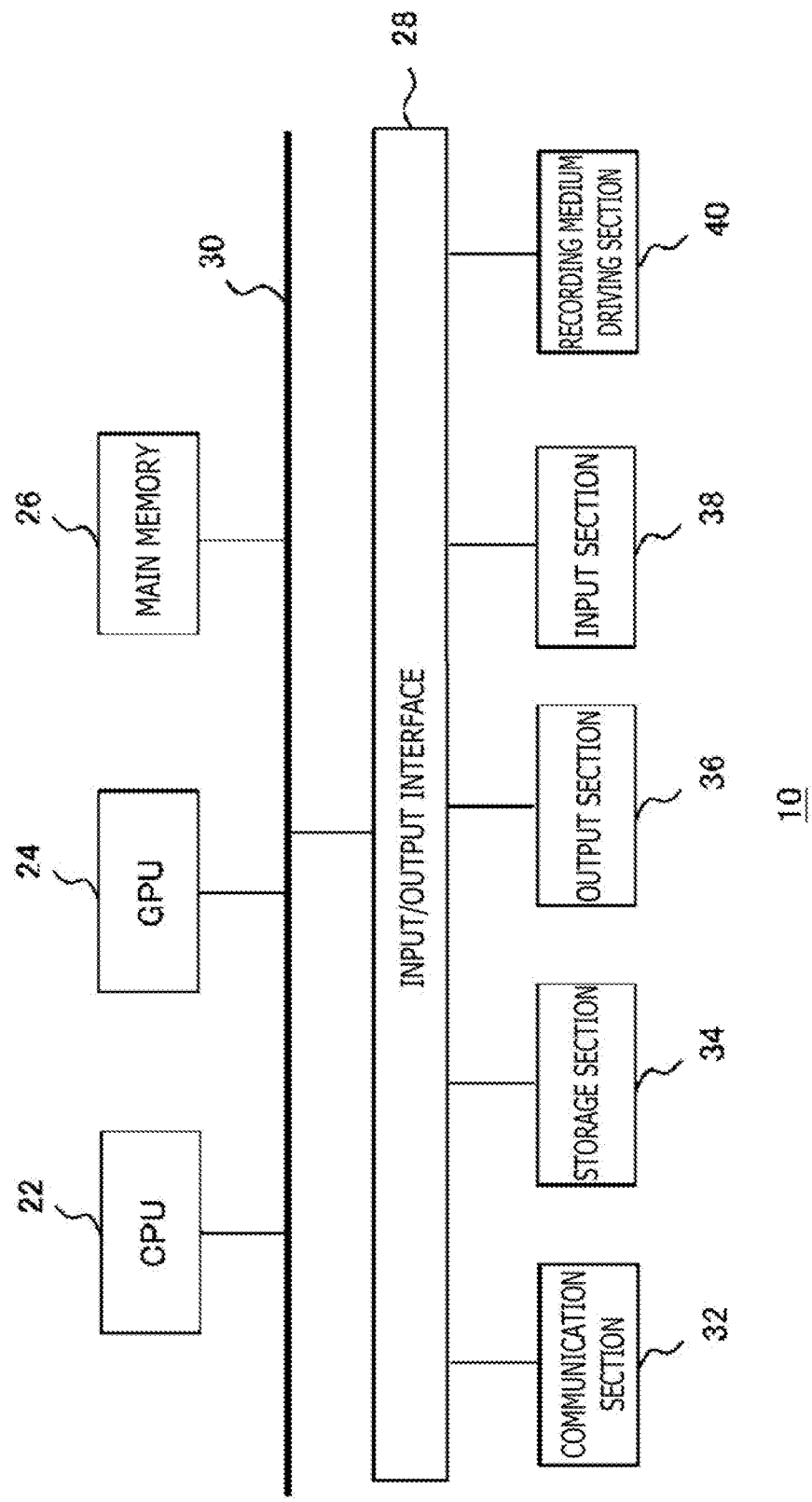
FIG. 3 is a schematic diagram depicting an internal circuit configuration of an information processing apparatus of the embodiment.

FIG. 3 depicts an internal circuit configuration of the information processing apparatus 10. The information processing apparatus 10 includes a central processing unit (CPU) 22, a graphics processing unit (GPU) 24, and a main memory 26. These components are interconnected via a bus 30. The bus 30 is further connected with an input/output interface 28. The input/output interface 28 is connected with a communication section 32 that includes peripheral interfaces such as universal serial bus (USB) and Institute of Electrical and Electronics Engineers (IEEE) 1394 ports and a wired or wireless local area network (LAN) network interface, a storage section 34 such as a hard disk drive or a nonvolatile memory, an output section 36 that outputs data to the flat-screen display 16 and to the HMD 18, an input section 38 that receives input of data from the imaging device 12, input device 14, and HMD 18; and a recording medium driving section 40 that drives removable recording media such as a magnetic disk, an optical disk, or a semiconductor memory.

The CPU 22 controls the entire information processing apparatus 10 by executing an operating system stored in the storage section 34. Also, the CPU 22 executes various programs that were read from removable recording media and loaded into the main memory 26 or have been downloaded through the communication section 32. The GPU 24 has the functions of a geometry engine and a rendering processor. The GPU 24 performs a rendering process in accordance with rendering instructions from the CPU 22 so as to store a display image into a frame buffer, not depicted. The GPU 24 proceeds to convert the display image stored in the frame buffer into a video signal that is output to the output section 36. The main memory 26 is composed of a random access memory (RAM) that stores programs and data necessary for processing.

Figure 4:
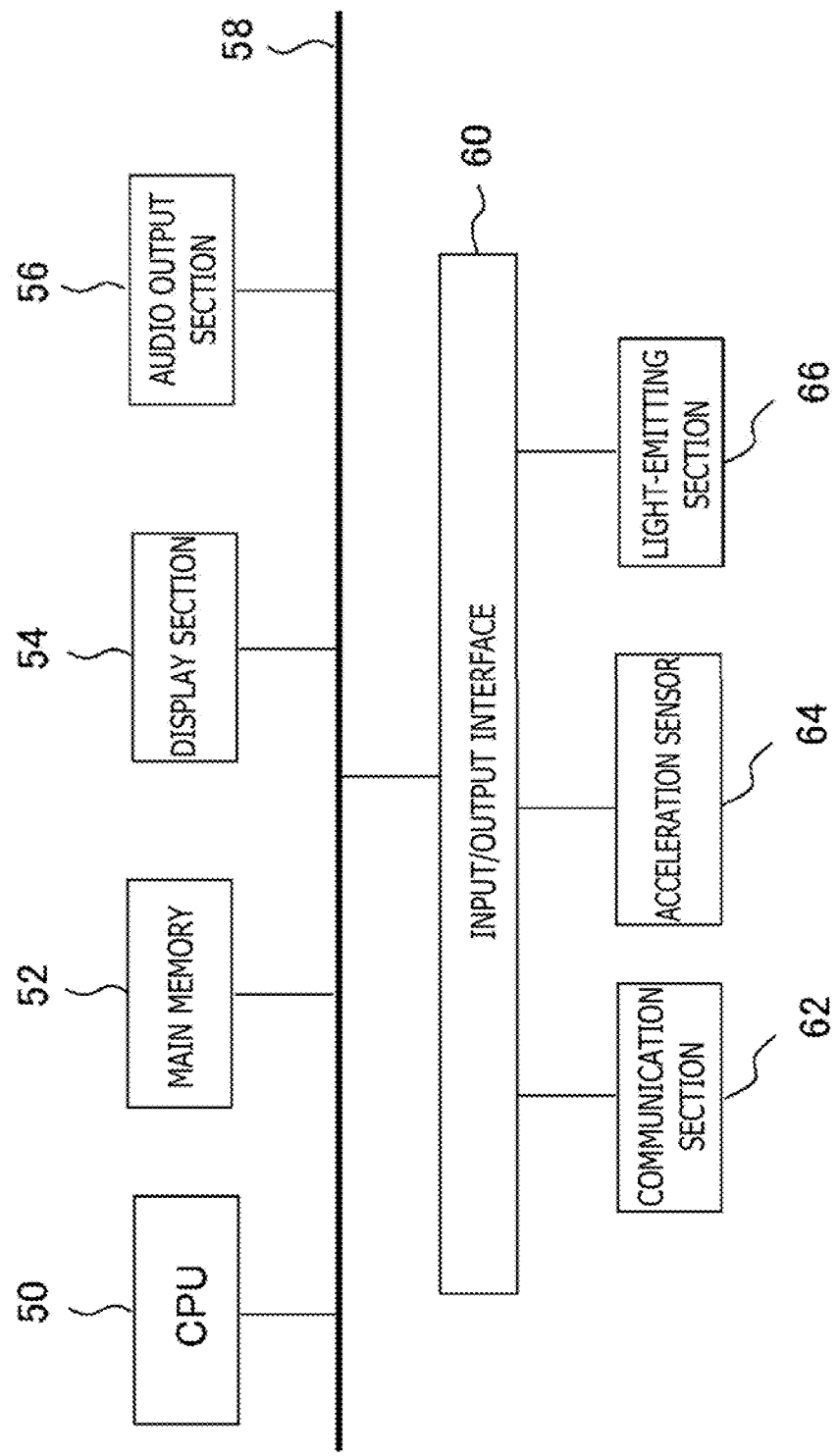
FIG. 4 is a schematic diagram depicting an internal circuit configuration of the HMD of the embodiment.

FIG. 4 depicts an internal circuit configuration of the HMD 18. The HMD 18 includes a CPU 50, a main memory 52, a display section 54, and an audio output section 56. These sections are interconnected via a bus 58. The bus 58 is further connected with an input/output interface 60. The input/output interface 60 is connected with a communication section 62 formed by a wired or wireless LAN network interface, an acceleration sensor 64, and a light-emitting section 66.

The CPU 50 processes information acquired from the sections of the HMD 18 via the bus 58 and supplies output data to the display section 54 and to the audio output section 56. The main memory 52 stores the programs and data needed by the CPU 50 for the processing. However, depending on the design of the application to be executed or of the apparatus to be used, the HMD 18 need only output the data forwarded from the information processing apparatus 10 that performs almost all processing involved. In this case, the CPU 50 and the main memory 52 may be replaced with simpler devices.

The display section 54, made up of a display panel such as a liquid crystal display panel or an organic EL panel, displays images before the eyes of the user wearing the HMD 18. As mentioned above, a pair of parallax images may be displayed in two display regions corresponding to the right and left eyes so as to present a stereoscopic view. The display section 54 may further include a pair of lenses positioned between the display panel and the user's eyes when the user wears the HMD 18, the lenses serving to widen the viewing angle of the user.

The audio output section 56, made up of speakers or earphones positioned corresponding to the user's ears when the HMD 18 is worn, provides the user with sounds. The number of output audio channels is not limited in particular. The channels may be monaural, stereo, or surround. The communication section 62 acts as an interface that exchanges data with the information processing apparatus 10 or with the flat-screen display 16. For example, the communication section 62 may be implemented using known wireless communication technology such as Bluetooth (registered trademark).

The acceleration sensor 64 detects the inclination of the HMD 18 by measuring gravitational acceleration in a given axis direction. The HMD 18 may also be equipped with other sensors including a gyro sensor. Measurements acquired by the sensors are transmitted to the information processing apparatus 10 via the communication section 62. The light-emitting section 66 is a light-emitting element or an aggregate of light-emitting elements. As depicted in FIG. 2, the light-emitting elements are attached to multiple locations on the external surface of the HMD 18. The light-emitting elements are tracked as markers in order to acquire the position of the HMD 18. Also, the posture of the HMD 18 is acquired from the number of light-emitting element images and their positional relations to each other in a captured image.

The information processing apparatus 10 acquires the position and posture of the user's head with higher accuracy by integrating information obtained from multiple means such as the acceleration sensor 64 and the light-emitting section 66. In some cases, the acceleration sensor 64 may be omitted with this embodiment.

Figure 5:
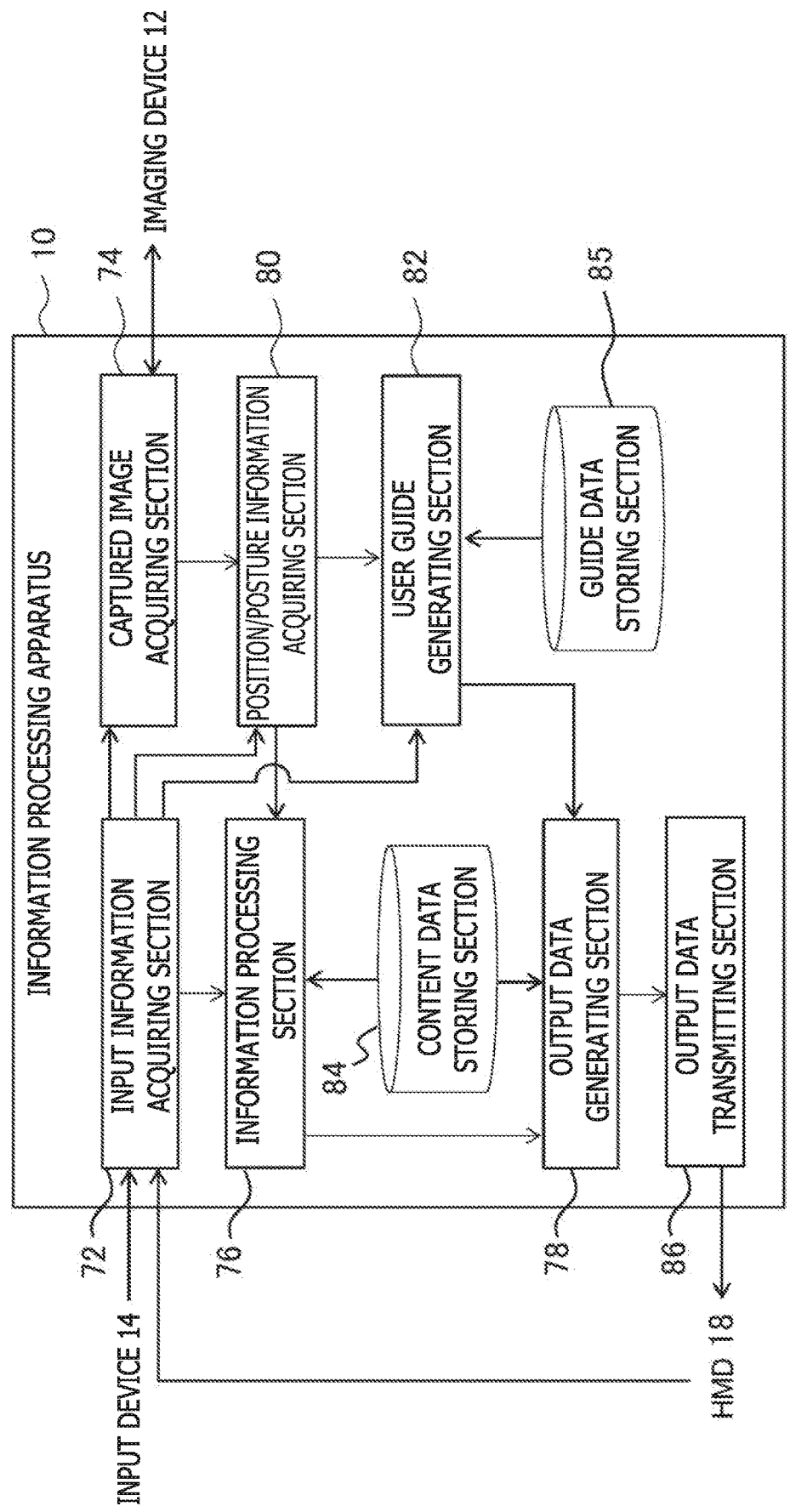
FIG. 5 is a schematic diagram depicting a functional block configuration of the information processing apparatus of the embodiment.

FIG. 5 depicts a functional block configuration of the information processing apparatus 10. The functional blocks depicted in FIG. 5 may be configured by hardware using the CPU, GPU, memories, and data bus depicted in FIG. 3 for example, or by software using programs that are typically loaded from recording media into memory to implement such functions as data input, data retention, image processing, and communication. It will thus be appreciated by those skilled in the art that these functional blocks are configured by hardware only, by software only, or by a combination thereof in diverse forms and are not limited to any one of such forms.

The information processing apparatus 10 includes an input information acquiring section 72 that acquires input information from the input device 14 and from the HMD 18, a captured image acquiring section 74 that acquires captured image data from the imaging device 12, an information processing section 76 that performs information processing in keeping with content such as video games, an output data generating section 78 that generates data to be output, and a content data storing section 84 that stores the data necessary for information processing and image generation. The information processing apparatus 10 further includes a position/posture information acquiring section 80 that acquires the position and posture information about the user based on captured images for example, a user guide generating section 82 that generates as a user guide the information about the user's conditions in the real space, a guide data storing section 85 that stores the rules for user guide presentation and the data necessary for user guide output, and an output data transmitting section 86 that transmits the data to be output to the HMD 18.

The input information acquiring section 72 acquires the content of the user's operations from the input device 14. The user's operations in this case may include selection of the application or the content to be executed, start and end of processing, input of commands, and other operations performed on common information processing apparatuses, as well as operations carried out on the user guide such as selection of user guide display or non-display and switching of the direction of the image displayed as the user guide, as will be discussed later. The input information acquiring section 72 supplies the information acquired from the input device 14 to the captured image acquiring section 74, to the information processing section 76, or to the user guide generating section 82 depending on the content of the acquired information. Furthermore, the input information acquiring section 72 receives measurements from the acceleration sensor 64 of the HMD 18 at a predetermined rate and forwards the received measurements to the position/posture information acquiring section 80.

The captured image acquiring section 74 acquires at a predetermined rate the data of captured images such as stereoscopic images obtained by the imaging device 12 through video imaging. The captured image acquiring section 74 may further control the start and end of the imaging by the imaging device 12 in accordance with process start/end requests acquired by the input information acquiring section 72 from the user, or may control the type of data to be acquired from the imaging device 12 in keeping with the result of the processing by the information processing section 76.

The position/posture information acquiring section 80 acquires at a predetermined rate the position and posture information about the user by detecting images of predetermined target objects from the captured image. For example, the positions of the user's head and hands in the real space are acquired on the basis of images of the light-emitting markers attached to the HMD 18 and to the input device 14. Alternatively, the position/posture information acquiring section 80 may utilize image analysis techniques in combination, tracking part of the user's body using contour lines or detecting the face or a target object having a particular pattern through pattern matching, for example. Depending on the configuration of the imaging device 12, the position information acquiring section 80 may identify the distance to the user by measuring reflected infrared rays as mentioned above. The position/posture information acquiring section 80 may further identify the posture of the user's head in a more detailed manner by integrating measurement results from the acceleration sensor of the HMD 18. Moreover, depending on the nature of the user guide to be presented, the position/posture information acquiring section 80 may also detect the positions of objects other than the user.

The information processing section 76 processes electronic content such as video games designated by the user. The processing includes the use of the user position information or user posture information acquired by the position/posture information acquiring section 80. As mentioned above, there are no particular constraints on the content of downstream information processing to be performed by the information processing section 76 in response to the user's operations or movements given by way of the input device 14.

In accordance with requests from the information processing section 76, the output data generating section 78 generates image and audio data to be output as a result of information processing. For example, the output data generating section 78 generates, as right and left parallax images, a virtual world seen from the point of view corresponding to the position and posture of the user's head. When presented with the parallax images before the eyes in the HMD 18 together with audio output from the virtual world, the user gets the sensation that he or she is actually in the virtual world. The content data storing section 84 stores the programs and the image and audio data necessary for information processing by the information processing section 76 and for data generation processing by the output data generating section 78.

On the basis of the position and posture information about the user and other objects acquired by the position/posture information acquiring section 80, the user guide generating section 82 performs processes related to presenting the user guide for prompting the user to confirm the conditions of the surroundings in the real world or for giving the user suggestions about what action to take subsequently. For example, the user guide generating section 82 may present, in a graphical or other easy-to-understand format, such information as relative positions to the imaging device 12, a suitable area for the user to be in (called the "play area" hereunder), and the direction in which to move to return to the center of the play area.

The user guide presenting the above-mentioned information is superposed on the ongoing game screen, for example. This allows the user to understand the circumstances in the real world during a video game for example, without removing the HMD. The user guide generating section 82 causes the user guide to appear as needed in response to user guide displaying operations performed by the user. Alternatively, the user guide generating section 82 may display the user guide as a warning of danger depending on the circumstances regardless of user operations.

The guide data storing section 85 stores the camera angle of view of the imaging device 12, the settings of the play area with respect to the angle of view, setting information such as the conditions for outputting the user guide and the specifics to be presented, and image data necessary for generating the user guide. These items of information are retrieved from the guide data storing section 85 as needed. The information other than the camera angle of view may be set in association with the nature of information processing carried out by the information processing section 76. The user guide generating section 82 may present the user guide by sound in addition to the image display. In this case, the audio data to be output according to circumstances is also stored in the guide data storing section 85. Typical examples of the user guide will be discussed later.

The user guide generating section 82 supplies the generated user guide data to the output data generating section 78. The user guide is generated in a manner always reflecting changes in the circumstances such as the user position. Thus the user guide generating section 82 thus generates the data continuously at a predetermined rate as long as any condition for displaying the user guide is being met. The output data generating section 78 superposes the image and the sound of the supplied user guide onto the image and the sound generated as a result of information processing performed by the information processing section 76. The output data transmitting section 86 successively acquires the output data generated by the output data generating section 78 and, after processing the data as needed, transmits the data to the HMD 18.

Figure 6:
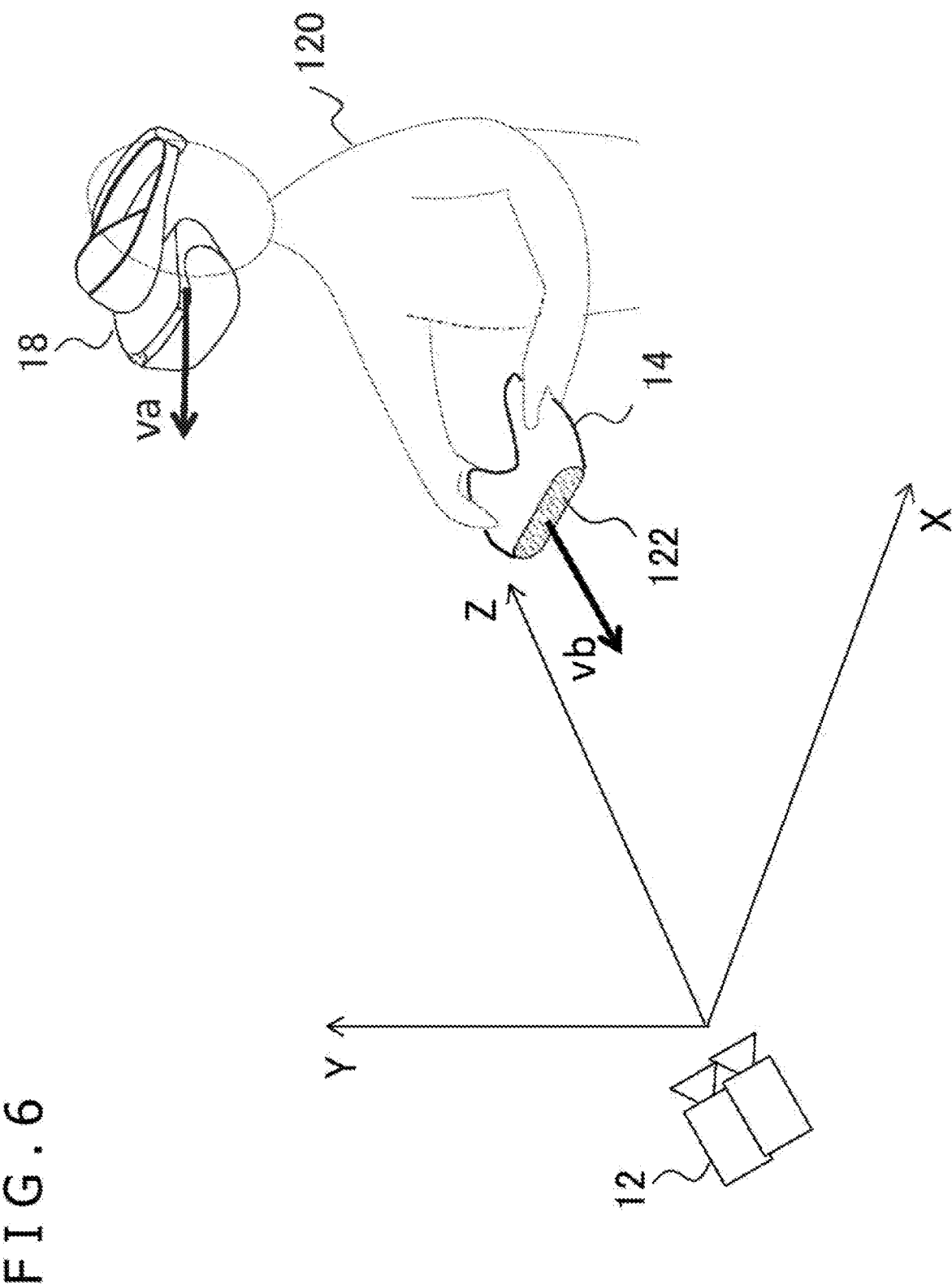
FIG. 6 is an explanatory diagram explaining information obtained by the embodiment from captured images.

FIG. 6 is an explanatory diagram explaining information obtained by the embodiment from captured images. In FIG. 6, a user 120 holds the input device 14 by hand and wears the HMD 18. The input device 14 is equipped with light-emitting markers 122 which, when the device is held in a manner suitable for the operation, face straight at the imaging device 12. The light-emitting markers of the HMD 18 are configured as depicted in FIG. 2. If the imaging device 12 is a stereo camera, a distance Z from an imaging surface of the imaging device 12 to each light-emitting marker is obtained on the basis of the parallax between the images making up a stereoscopic image. The position of a light-emitting marker image on an image plane (X-Y plane) of either the right or the left captured image represents the apparent marker position from the imaging device 12.

The position that integrates these pieces of information, i.e., the position on the X-Y plane specifically, is inversely projected using the distance Z from the imaging device 12 in order to find the position of each light-emitting marker in the three-dimensional space of the real world. Furthermore, the number of images of the light-emitting markers on the HMD 18 and the positional relations between these images are used to obtain the posture of the HMD 18 in the real space (vector va). The configuration of the images of the light-emitting markers 122 on the input device 14 is used to obtain the posture of the input device 14 in the real space (vector vb).

On the basis of the positions and postures of these devices in the real space, the information processing section 76 in the information processing apparatus 10 can represent a virtual world of which the field of view varies with the direction of the face of the user 120 or depict the manner or the like in which an object in the image moves in keeping with the movement of the input device 14. If the distance from the imaging device 12 is estimated using the apparent sizes of the markers, the imaging device 12 need not be a stereo camera. The same also applies where distance measurement techniques making use of reference light are adopted. It may not be necessary to track both the HMD 18 and the input device 14 at the same time.

Figure 7:
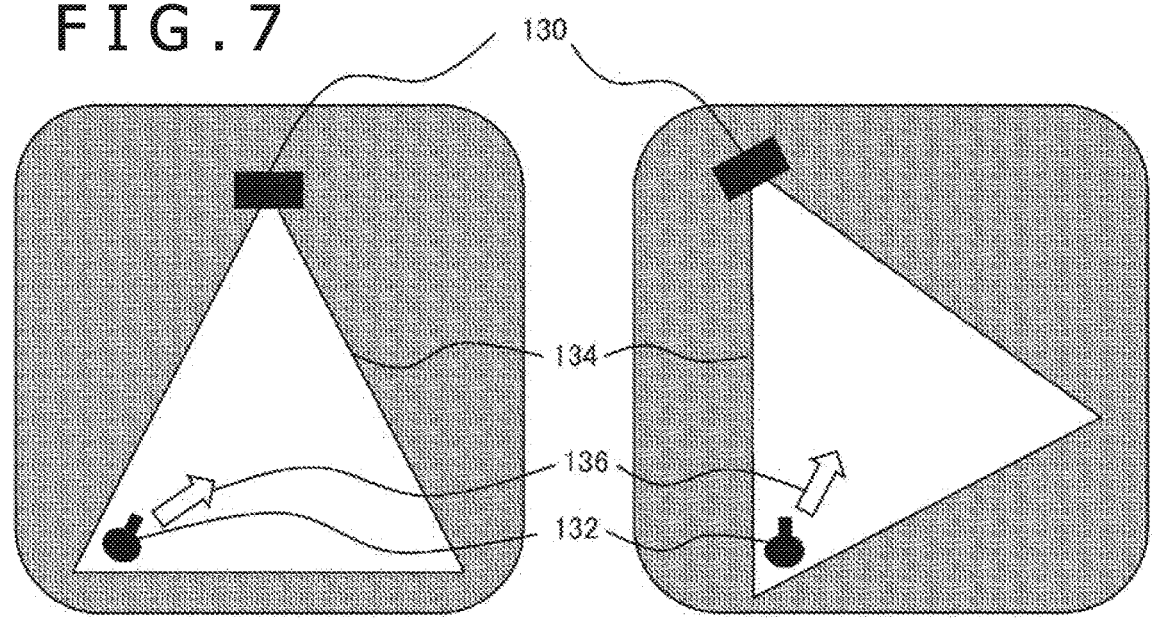
FIG. 7 is a schematic diagram depicting typical images each being a bird's-eye view displayed as a user guide with this embodiment.

In the above-described system, the user guide generating section 82 recognizes the position and posture of the HMD 18 as the user's position and head posture, and graphically displays the conditions of the surroundings in an easy-to-understand manner from the user's standpoint. FIG. 7 depicts typical images each being a bird's-eye view displayed as a user guide. The user guide of image (a) and that of image (b) in FIG. 7 depict schematically bird's-eye views of a real space including the imaging device and the user. The image (a) is an image in reference to the position of the imaging device, and the image (b) is in reference to the user's direction. In both images, a rectangle 130 indicating the imaging device and a circle 132 indicating the user are presented in a manner reflecting the actual positional relations and directions involved.

The circle 132 indicative of the user is furnished with a bar pointing to the direction in which the user actually faces. Both images also include an area 134 representing the play area determined in the horizontal direction by the camera angle of view for example, and an arrow 136 pointing to the direction in which the user is to move. Basically, the play area is set to coincide horizontally and vertically with the camera angle of view or to be narrower than the angle of view to provide a range of positions suitable for information processing. In the depth direction from the camera, the play area is set to form a range in which the accuracy of position acquisition is kept sufficiently high or to be narrower than that range to provide a range of positions suitable for information processing. The shape and the size of the play area may be changed or selected by the user depending on the nature of information processing, e.g., in keeping with the type of video game to be played or with the size of the room the user is in.

The image (a) is a representation depicting that the rectangle 130 indicative of the imaging device is always at the top center. This image allows the user to confirm that he or she is on the left edge of the play area and is relatively far away from the imaging device 12. The user thus recognizes that moving farther left or backward would constitute a deviation from the play area. The user also recognizes the direction in which to move to return to the center of the play area. When the user actual moves with the user guide displayed as described above, the circle 132 indicative of the user is shifted in conjunction with the user's movement. Displaying a bird's-eye view reflecting the user's movement in this manner clarifies the relative position between the imaging device and the play area on the one hand and the user on the other hand. The bird's-eye-view further presents, visually and objectively, the user's intuitively and ambiguously perceived step length and direction. This makes it possible to let a "field" recognized by the information processing apparatus 10 coincide with the user's sensation of movement.

In the representation such as that of the image (a), with the user not facing straight at the imaging device 12, the front-back/left-right orientation of the user does not coincide with the up-down/left-right orientation of the image. In this case, an attempt to move in the direction of the arrow 136 may not be successfully accomplished. The image (b), by contrast, is a representation illustrating that the user always faces in the vertical direction of the image. In this case, changing the user's direction causes the field including the rectangle 130 and area 134 to rotate in a direction relatively reverse to the user. This allows the front-back/left-right orientation of the user to always coincide with the top-down/left-right orientation of the image. As a result, the direction of the arrow 136 coincides with the user's sense of direction, which enables the user to move easily in the desired direction.

The pictorial figures indicative of the imaging device and other objects in the drawings are not limitative of how these things are to be represented. The setting information such as the shape of the play area to be set up, whether or not to provide guidance using an arrow, and the direction of guidance if the guidance is to be provided, may be varied depending on the nature of information processing performed by the information processing section 76 and on the circumstances. Also, depending on the nature of guidance, the arrow may be curved such us U-shaped. The length of the arrow may be varied to represent the distance to be traveled. The point of reference for orienting the bird's-eye view may be switched between the position of the imaging device and the position of the user depending on the nature of information processing. Alternatively, the switching may be performed by the user by means of the input device 14 for example. The switching involving the user guide, to be discussed below, may also be accomplished likewise.

Figure 8:
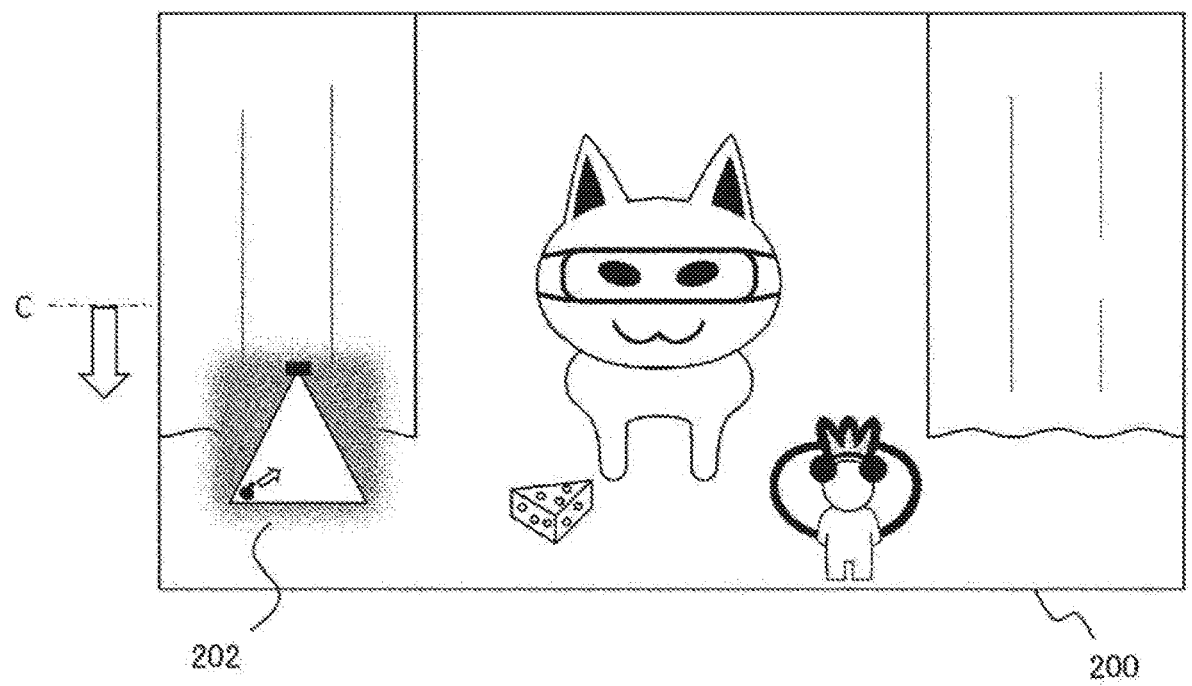
FIG. 8 is a schematic diagram depicting a typical display screen displaying an image of the user guide with this embodiment.

FIG. 8 depicts a typical display screen displaying an image of the user guide. A display screen 200 is configured to superpose a user guide 202 such as one depicted in FIG. 7 onto the content image such as a game screen. The user guide generating section 82 causes the user guide 202 to appear when the user performs operations to display the user guide, and causes the user guide 202 to disappear when the user performs operations to terminate the display. The user guide 202 may be displayed regardless of the user's operations depending on the circumstances.

In any case, with the user guide superposed on the original content image, the user is able to confirm the displayed information without moving the line of sight significantly. On the other hand, when the content image constitutes a virtual world with a sense of depth, the user might be surprised or irritated if a component image with no sense of depth suddenly appears before the eyes.

In order to avoid such unpleasantness, the contours of the user guide 202 may be softened by blurring or by a blending, for example. This helps to enhance the affinity of the user guide in the foreground with the virtual world in the background. Alternatively, the entire user guide 202 may be made translucent. Also, unless it is necessary to display information in an emergency, the user guide 202 is preferably displayed at a position away from the point of regard. For example, if the display is such that the field of view is varied in accordance with the user's line of sight, the point of view is inevitably fixed at the screen center. In such a case, the user guide 202 is displayed at least a predetermined distance away from the screen center.

Also, since people can look down more easily than look up, the user guide 202 may be displayed in the lower half region of the display screen (the screen region below a horizontal center line C). The user can then move his or her point of regard effortlessly from the content image to the user guide. The user can also continue playing the game, for example, by taking a glance at the user guide 202 for a check while keeping the point of regard on the content image. These measures contribute to suppressing situations where the user needs to take time to focus on an image that has appeared or where forced small eyeball movements make the user feel sick.

Figure 9:
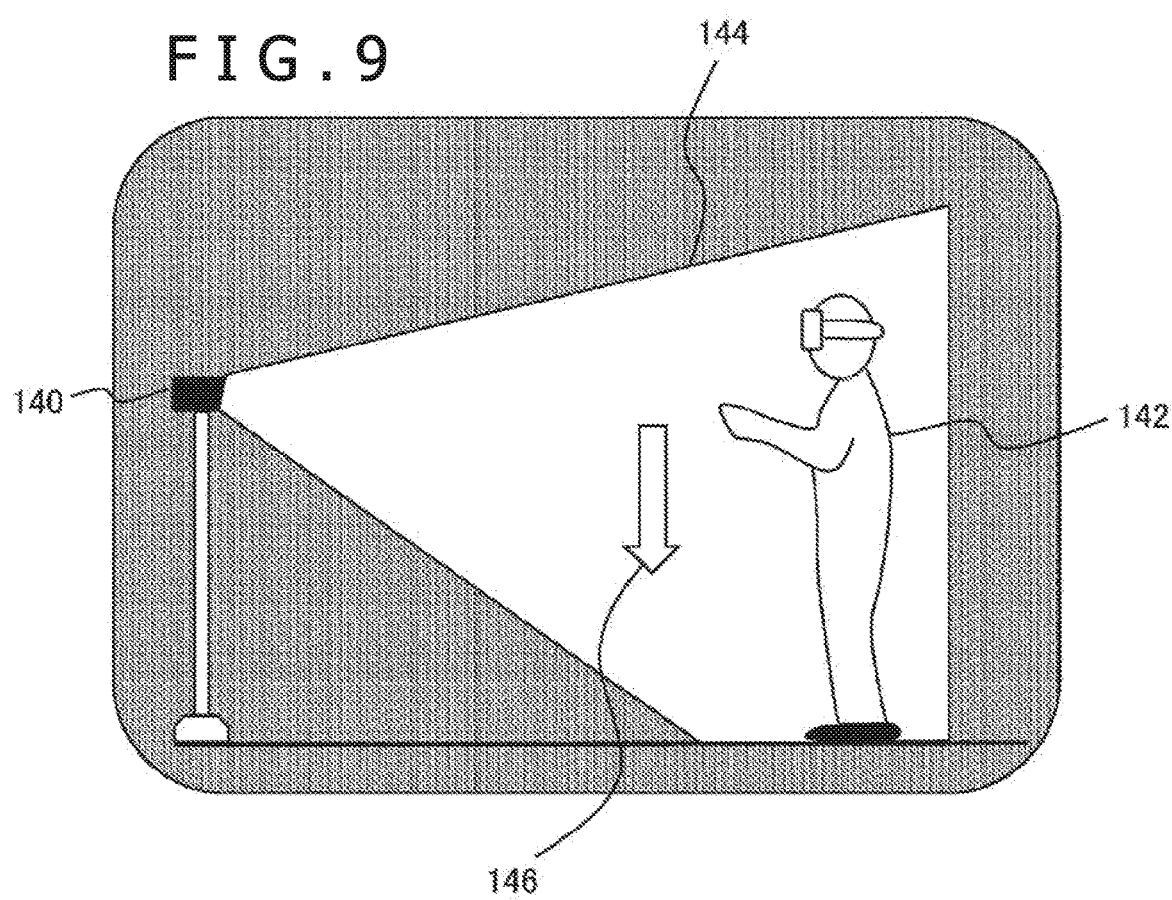
FIG. 9 is a schematic diagram depicting a typical image of a side view displayed as the user guide with this embodiment.

FIG. 9 depicts a typical image of a side view displayed as the user guide. This example gives a schematic representation of a real space including the imaging device and the user, the real space being viewed from the left side of the user. That is, a rectangle 140 indicating the imaging device and an object 142 indicative of the user are presented in a manner reflecting the actual distances and directions involved. This image also depicts an area 144 determined typically by the camera angle of view and indicating the play area in the vertical direction, and an arrow 146 indicating the direction in which the user is to move.

The display above enables the user to recognize the conditions of the surroundings as explained earlier with reference to FIG. 7. For example, the user can become aware that the user is so close to the imaging device that his or her head is about to stick out of the angle of view or that the user is too far away from the imaging device to maintain the accuracy of processing. Where the posture is defined by the nature of information processing, the user in the wrong posture is prompted to make the correction. For example, if playing a given video game is predicated on the assumption that the user is sitting, the user suddenly standing up may be prompted to sit down by an arrow 146.

Compared with the images depicted in FIG. 7, this example depicts the user's appearance as a more detailed object. The actual posture of the user can thus be reflected in detail in the image. Depending on the nature of what needs to be displayed, however, simplified graphics such as those in FIG. 7 may be preferred. The user may also be prompted to assume the correct posture by an animation in which such objects and pictorial figures are varied. For example, the user may be prompted to stand up by an animation of an expanding graphic and to sit down by an animation of a shrinking graphic.

Figure 10:
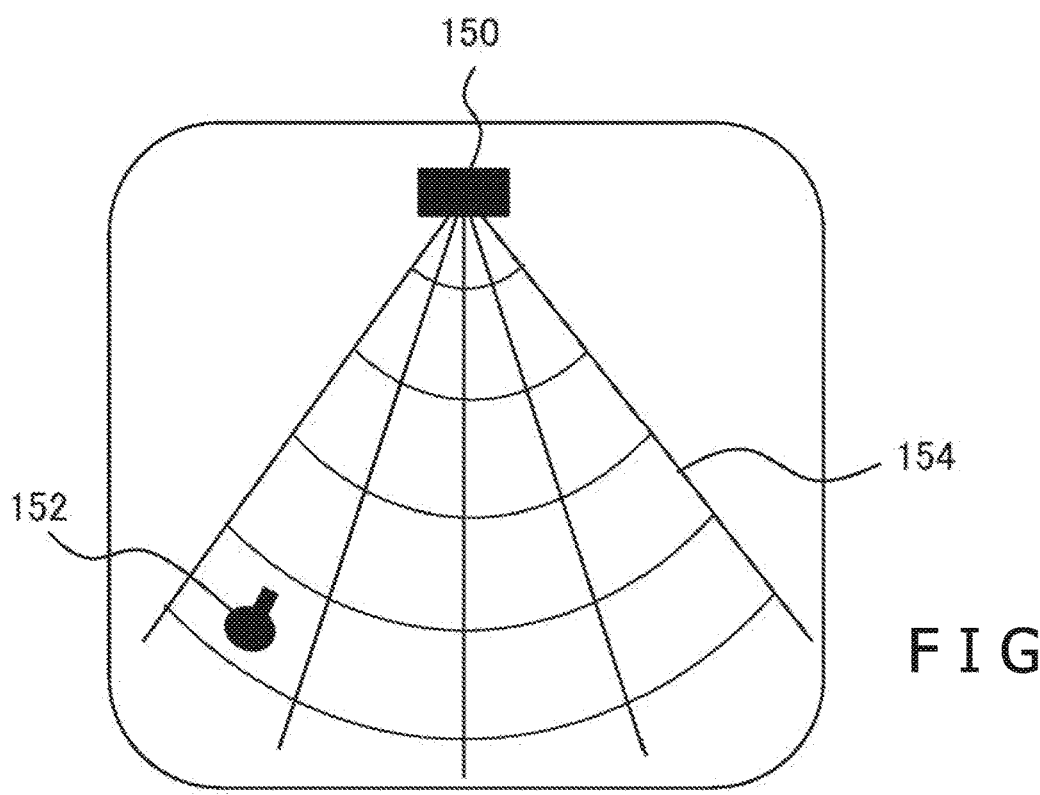
FIG. 10 is a schematic diagram depicting another typical image of a bird's-eye view displayed as the user guide with this embodiment.

FIG. 10 depicts another typical image of a bird's-eye view displayed as the user guide. As with the images in FIG. 7, this example presents a rectangle 150 denoting the imaging device and a circle 152 indicative of the user in a manner reflecting the actual positional relations and directions involved. On the other hand, this example uses lines 154 to present information about the camera angle of view instead of the play area. Specifically, this example presents radiating straight lines indicative of four azimuths dividing the camera angle of view into four equal portions, as well as concentric circular arcs indicating the distances from the imaging device and spaced a predetermined interval apart.

If the entire area covered by the camera field of view is set as the play area, the lines 154 approximately delimit the play area. For example, before the information processing such as a video game is executed, the user guide is displayed so that the user wearing the HMD 18 may actually move while viewing the displayed user guide. In so doing, the user can grasp the correspondence between the user's displacement and direction relative to the camera field of view on the one hand, and the user's sensation of step length and direction recognition on the other hand. If the user guide is superposed on the virtual world displayed on the HMD besides being displayed prior to information processing, the user can recognize the correspondence between the scenes of the virtual world and the user's position in the camera field of view, and can act accordingly.

The illustrated example is a bird's-eye view with the imaging device indicated at the top. The bird's-eye view of a similar configuration may be one in which the user is oriented vertically upward as depicted in the image (b) of FIG. 7. The side view such as one in FIG. 9 may depict lines dividing the angle of view into equal parts in the vertical direction and lines indicating distances from the imaging device. As another alternative, a three-dimensional structure constituted by planes dividing the angle of view into equal parts in the horizontal direction and the vertical direction and by equidistant planes relative to the imaging device may be defined. The three-dimensional structure may then be rendered from a desired point of view. Then the structure as viewed from the user may be superposed on the image of the virtual world displayed on the HMD 18 to provide at-a-glance correspondence between the angle of view and the virtual world.

Figure 11:
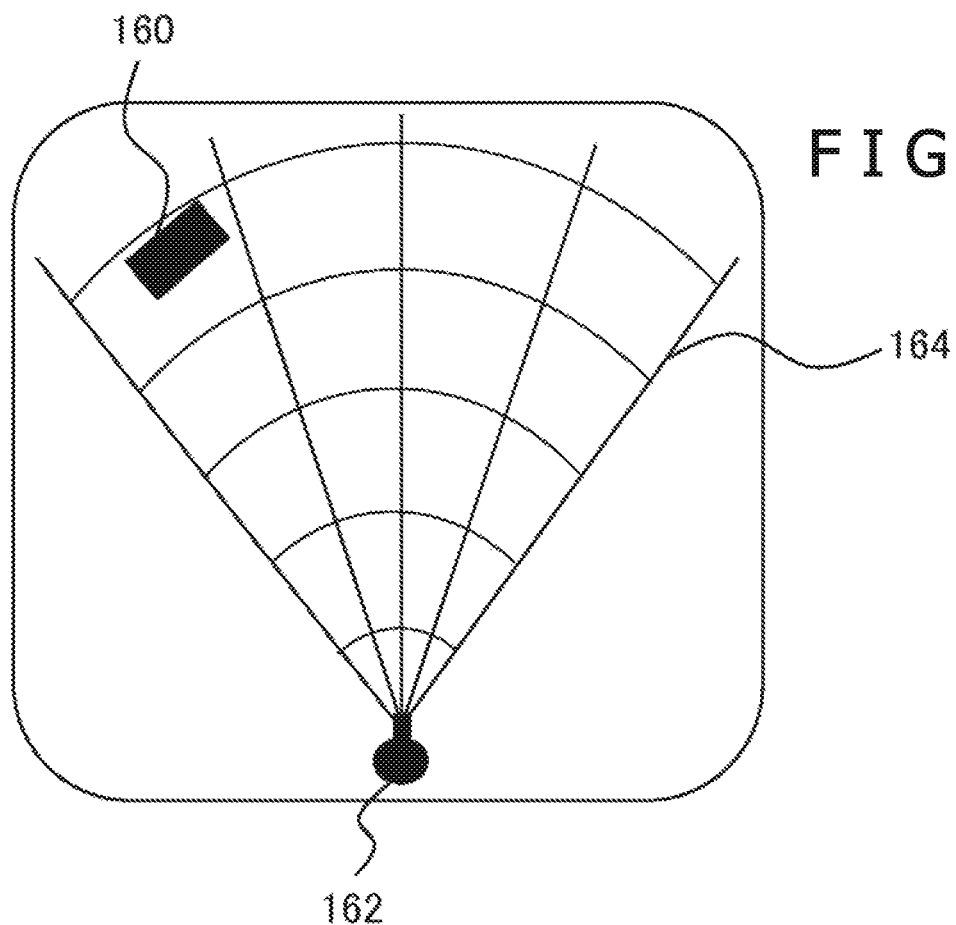
FIG. 11 is a schematic diagram depicting another typical image of a bird's-eye view displayed as the user guide with this embodiment.

FIG. 11 depicts another typical image of a bird's-eye view displayed as the user guide. This example is a representation in which the user always faces in the vertical upward direction. Thus a circle 162 indicating the user is presented at the bottom center of the image, and a rectangle 160 indicative of the imaging device is presented at a position reflecting the relative position to the user. Also in this drawing, lines 164 denote information about the user's field of view instead of the information about the camera angle of view in FIG. 10.

Specifically, radiating straight lines are depicted to indicate the azimuths dividing the user's effective viewing angle into four equal parts, and concentric circular arcs are depicted to denote the distances from the user spaced a predetermined interval apart. The effective viewing angle in this case is a known value representing the angle that enables the human brain to precisely recognize objects. This user guide allows the user to easily become aware of what is actually in the field of view even though the real world is hidden by the HMD, as well as where the imaging device is positioned in the field of view. This enables the user to intuitively determine in which direction to move and how much to move to face straight at the imaging device. Although the illustrated example is a bird's-eye view in reference to the user's direction, the bird's-eye view may alternatively be depicted with the imaging device positioned at the top as in FIG. 10. An arrow for guiding the user may be added to the images depicted in FIGS. 10 and 11.

Figure 12:
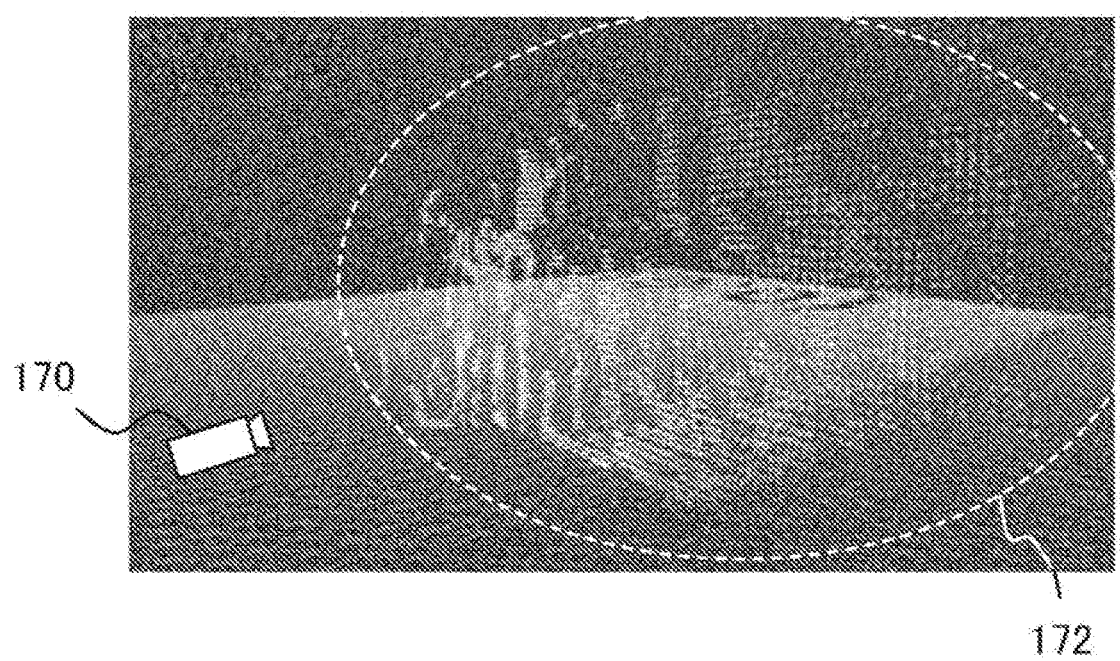
FIG. 12 is a schematic diagram depicting a typical image of a point cloud displayed as the user guide with this embodiment.

FIG. 12 depicts a typical image of a point cloud displayed as the user guide. Whereas the examples in FIGS. 7, 9, 10, and 11 are two-dimensional diagrams overlooking or laterally looking at the real world, a three-dimensional space image may be provided for an easy grasp of the real world as viewed obliquely. FIG. 12 gives one such example that renders a point cloud 172 into an image indicating objects in a three-dimensional space corresponding to the real world, together with a pictorial FIG. 170 representing the imaging device. The point cloud 172 presented here is a set of points representing the surfaces of objects including the user, the set of points being obtained by inversely projecting a depth map of the objects to a three-dimensional space.

The depth map is an image presented by acquiring for each pixel the distance in the depth direction based on the parallax of the stereoscopic image as discussed above, the acquired distance being used as the pixel value of each pixel. The position/posture information acquiring section 80 generates the depth map. The user guide generating section 82 plots each pixel of the depth map in a virtual three-dimensional space on the basis of the distances represented by the pixel values, thereby arranging the points to make up the point cloud 172 in a global coordinate system. In this three-dimensional space, the objects to be imaged by the imaging device and the plane representing the room floor are also arranged. These objects and the plane are projected to a predetermined screen coordinate system to generate the image such as one in the drawing.

The depth map varies with changes in the positions and postures of the user and other objects, and so does the point cloud 172. As a result, the user can get an objective grasp of his or her position and movement relative to the imaging device as in the foregoing examples. When the user's operations to change his or her position and posture on the screen plane are allowed to be accepted, the user can confirm his or her relative position from an easy-to-view angle.

If the depth map is prepared by extracting the images of interest from the entire stereoscopic image, objects other than the user are also rendered at the same time. This makes it possible for the user to ascertain whether there are any obstacles nearby or whether a child or a pet, for example, has entered the play area. Whereas the illustrated example is made up of only the pictorial FIG. 170 representing the imaging device and the point cloud 172, the image may also include indications of the play area and the camera angle of view as well as an arrow pointing to the direction in which the user is to move as in the foregoing examples.

Figure 13:
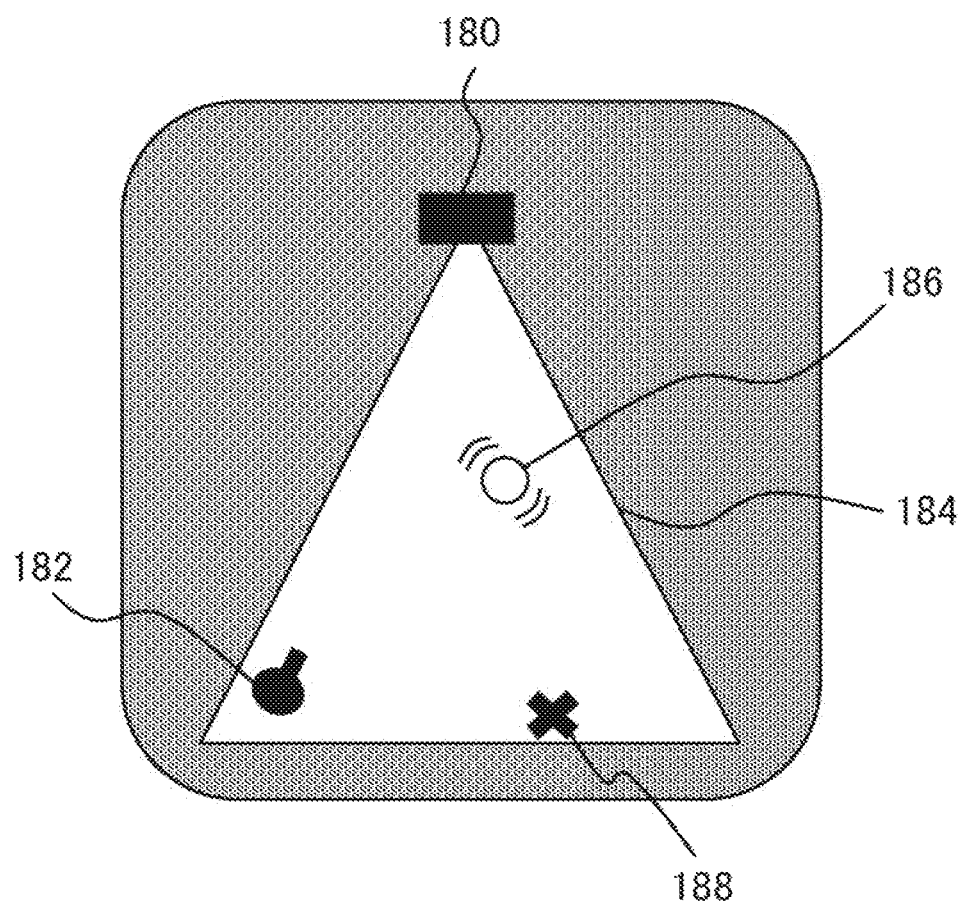
FIG. 13 is a schematic diagram depicting another typical image of a bird's-eye view displayed as the user guide with this embodiment.

FIG. 13 depicts another typical image of a bird's-eye view displayed as the user guide. This example, as in the images in FIG. 7, presents a rectangle 180 denoting the imaging device, a circle 182 indicative of the user, and an area 184 representing the play area in a manner reflecting the actual positional relations and directions involved. Also in this drawing, objects other than the user that are present in the play area are represented by pictorial figures corresponding to their presence. Specifically, a circle 186 denoting the input device and a cross 188 indicating an obstacle are presented.

The position of the input device and that of the obstacle are obtained by extracting images other than that of the user using the above-described depth map or a background differencing technique, for example. The input device is distinguished from the other objects based on the light-emitting markers attached to the outside of the input device or on the shape of the input device, for example. Any moving object other than the user is extracted by finding the difference in movement from the preceding frame. If the user has misplaced the input device or if the input device becomes necessary during information processing, the user guide allows the user to move to and pick up the input device without removing the HMD. If there are obstacles nearby or if a child or a pet has entered the play area, the user guide enables the user to recognize such objects and make them leave the area, thereby avoiding collisions or other danger.

Whereas the example of the illustration depicts the pictorial figures representing the input device and the obstacle at the same time, obviously only either of them may be presented depending on the circumstances. In particular, in a situation where there is danger due to an obstacle being detected in the play area for example, the user guide with a pictorial figure indicating the position of the obstacle may be displayed at the center of the screen or wherever the guide is easily noticeable by the user regardless of the user's operations. It is preferred that the pictorial figures indicative of the user, input device, and obstacle be shaped in a manner enabling the user to understand what they represent at a glance. The pictorial figures may be shaped very differently from each other as depicted, colored differently, or otherwise processed in a diverse manner for distinction.

The pictorial figures may be presented as an animation in which they are caused to blink or to vibrate minutely depending on the circumstances. For example, if the user is about to get out of the play area or if an obstacle has entered the play area, an animated display alerts the user to what is happening. If some external force has caused the imaging device 12 to fall or to change its direction, the user may be alerted by a blinking rectangle 180 representing the imaging device. Such a change of the imaging device 12 may be detected by the position/posture information acquiring section 80 or by the user guide generating section 82 in conjunction with the captured image acquiring section 74 acquiring measurements from the acceleration sensor in the imaging device 12.

Figure 14:
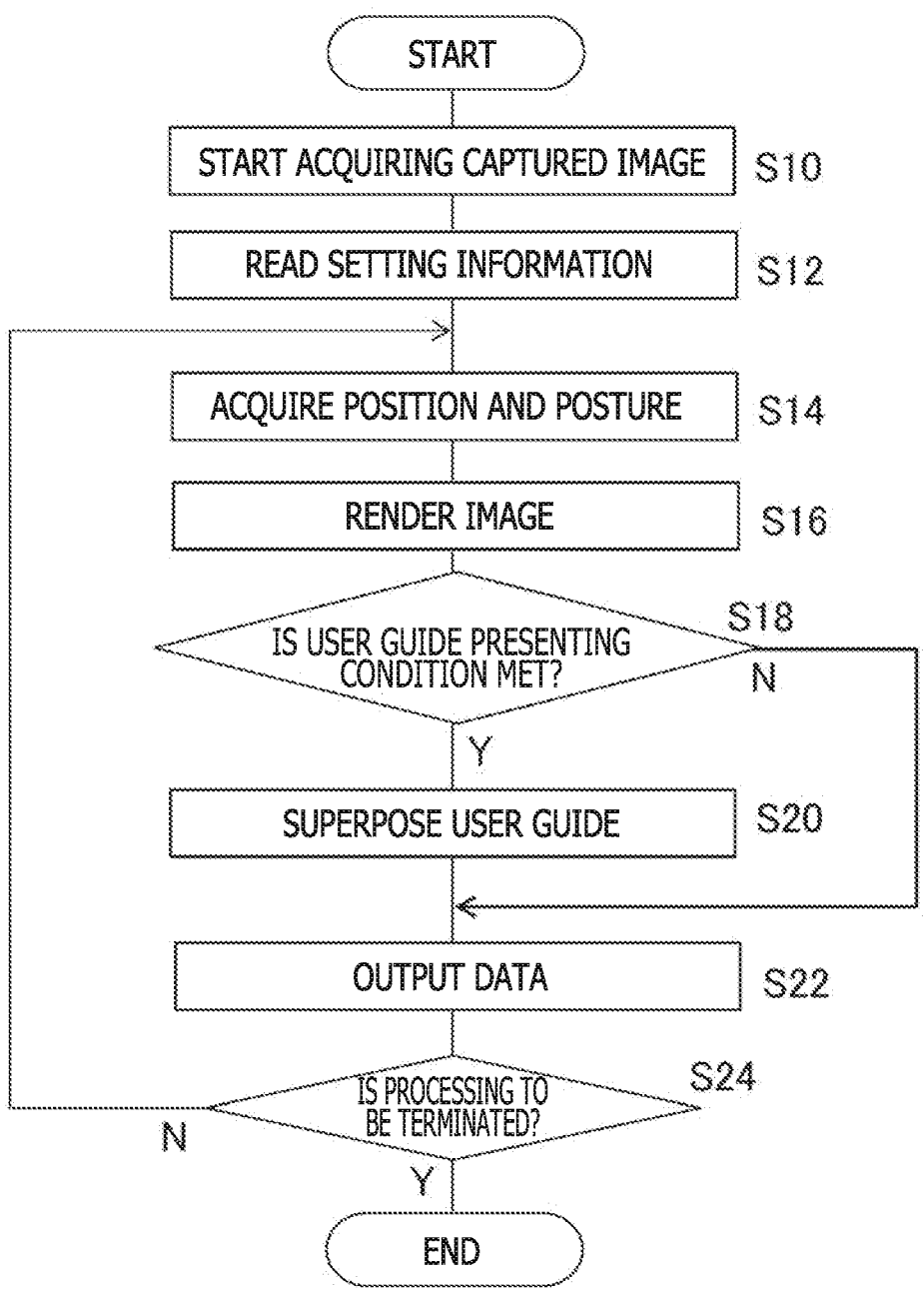
FIG. 14 is a flowchart depicting a procedure by which the information processing apparatus of this embodiment generates output data in keeping with the user's movement.

Explained below is the operation of the information processing apparatus 10 implemented in the configuration discussed above. FIG. 14 is a flowchart depicting a procedure by which the information processing apparatus of the embodiment generates output data in keeping with the user's movement. The process of this flowchart is started when the user sends a process start request to the information processing apparatus 10 via the input device 14, for example.

First, the captured image acquiring section 74 of the information processing apparatus 10 requests the imaging device 12 to start imaging, and starts acquiring data of the image captured and output by the imaging device 12 (S10). Meanwhile, the user guide generating section 82 reads from the guide data storing section 85 setting information such as the camera angle of view of the imaging device 12, the play area corresponding to that angle of view, the timing for displaying the user guide, and the specifics to be displayed thereby (S12). At this point, the setting information associated with the content to be executed upon selection by the user, for example, may be selectively read out.

Next, the position/posture information acquiring section 80 acquires the information about the user's position and posture based on the captured image (S14). Using the acquired information, the information processing section 76 performs information processing. The output data generating section 78 renders an image of the content to be displayed as a result of the information processing (S16). Meanwhile, the user guide generating section 82 verifies whether the conditions for displaying the user guide are met by the circumstances at that point (S18). The conditions for displaying the user guide include the execution of the user's operation to display the user guide, the presence of danger such as an obstacle in the play area, and factors impeding the normal progress of information processing such as an abnormal direction of the imaging device 12.

The user guide generating section 82 may, for example, set a flag in an internal register if any of the above conditions takes place and reset the flag when the condition disappears. In this manner, the user guide generating section 82 causes the processing to branch conditionally on the basis of the flag value. If none of the conditions for displaying the user guide is met (N in S18), the output data transmitting section 86 transmits to the HMD 18 the content image as rendered in S16 (S20). If any of the conditions for displaying the user guide is met (Y in S18), the user guide generating section 82 generates an image of the user guide based on the position and posture information acquired by the position/posture information acquiring section 80.

When supplied with the data, the output data generating section 78 superposes the user guide image onto the content image (S20). The output data transmitting section 86 outputs the resulting image superposed with the user guide to the HMD 18 (S22). In the process of S20, the audio data of the user guide may also be superposed on the audio data of the content. For example, specific voice phrases or instructions such as "Sit down" or "Move to the right" may be given. Also usable is a sound image localization technique by which, when the user approaches a boundary of the play area, a predetermined warning sound localized on that boundary is generated.

The data to be output as the user guide may be an image only, a sound only, or a combination of the two. Depending on the settings, the image captured by the imaging device 12 may be output unmodified to the HMD 18 as the user guide. This is an actual image that allows the user to determine whether there is any obstacle in the camera field of view or whether the camera installation is defective, for example. In such a case, the user guide generating section 82 may superpose on the captured image such text information as "Isn't there any obstacle?" together with a graphical user interface (GUI) through which the user may be prompted to input a confirmation of the information.

During a period in which there is no need to terminate the process in response to the user making a process stop request for example, the steps of rendering the content image based on the position information, superposing the user guide on the content image as long as any user guide presenting condition is being met, and outputting the resulting image to the HMD 18 are repeated at a predetermined rate (N in S24, S14 to S22). When there arises a need to terminate the process, the entire processing is brought to an end (Y in S24).

The above-described embodiment of the present invention constitutes a system that acquires the user position information from the images of interest in the captured image and performs information processing using the acquired information. The system presents as the user guide the information about the user's surroundings in the real world. This allows the user to recognize the position the user is in and the direction in which to move even when the user wearing the HMD is unable to see the outside world. This in turn prevents the user from getting out of the camera angle of view or of the presumed play area and from disrupting the information processing or colliding with objects outside the angle of view. When the user guide presents the conditions of objects other than the user at the same time, collisions with objects inside the play area are also averted.

Because the confirmation such as that described above can be made without removing the HMD, the user is under less burden with regard to recognizing the current circumstances and thereby avoiding danger. Also, because the user guide is displayed superposed where appropriate on the screen as needed, the user can confirm the superposed display while viewing the content image given by the HMD and is less prone to be distracted from the world view of the content. Furthermore, the user's step length and direction to move in, and other things that needed to be perceived intuitively are visualized in a manner associated with the position of the imaging device in the real world and with the range of the play area. For this reason, it is easy for the user to learn the appropriate movement to make. Since the position and posture information for use in the normal information processing is utilized, the user guide is implemented with limited processing load.

The criteria for determining the direction in which to display the bird's-eye view and the point of view from which to display the three-dimensional space can be switched by the user. This provides an easily understandable manner of display that enables the user to intuitively determine the direction to move in, for example. Arrow display and voice guidelines allow the users of all ages and all levels of understanding to make appropriate movements.

While the present invention has been described in conjunction with a specific embodiment given as an example, it should be understood by those skilled in the art that the above-described composing elements and various processes may be combined in diverse ways and that such combinations, variations and modifications also fall within the scope of this invention.

For example, the embodiment presents the user guide as an image that enables the user to understand his or her positional relation to the imaging device. On the other hand, if devices other than the imaging device for imaging the user, such as the camera and motion sensor attached to the HMD, are used especially to identify the user's position for example, the user position may be indicated in terms of positional relations to these objects other than to the imaging device. For example, if the play area is set according to predetermined rules, the user's position in the play area need only be indicated. If there exist pieces of play equipment or other users in the real space and if the positional relations to these objects are to be reflected in information processing, the positions of the equipment or of the users instead of the imaging device may be indicated in the user guide.

REFERENCE SIGNS LIST

8 Information processing system
10 Information processing apparatus
12 Imaging device
14 Input device
16 Flat-screen display
18 HMD
22 CPU
24 GPU
26 Main memory
72 Input information acquiring section
74 Captured image acquiring section
76 Information processing section
78 Output data generating section
80 Position/posture information acquiring section
82 User guide generating section
85 Guide data storing section
86 Output data transmitting section

INDUSTRIAL APPLICABILITY

As described above, the present invention is applicable to a game machine, an information processing apparatus, a display apparatus, and a system that includes any of these apparatuses, for example.

The invention claimed is:

1. An information processing apparatus having a central processing unit operating under the control of computer software stored within a memory, such that the information processing apparatus carries out actions, comprising:
acquiring position information about a head-mounted display;
performing information processing using the position information about the head-mounted display;
generating and outputting data of an image to be displayed as a result of the information processing; and
generating and outputting data of an image of a user guide indicating position information about a user in a real space using the position information about the head-mounted display,
wherein the generating and outputting the data of the image of the user guide includes determining whether to display the user guide in response to a user operation.

2. The information processing apparatus according to claim 1, wherein the generating and outputting the data of the image of the user guide includes indicating on the image of the user guide the position of an imaging device for imaging the head-mounted display to acquire the position information thereof.

3. The information processing apparatus according to claim 2, wherein the generating and outputting the data of the image of the user guide includes indicating on the image of the user guide lines dividing a camera angle of view of the imaging device into equal parts and equidistant curves relative to the imaging device.

4. The information processing apparatus according to claim 2, wherein:
the acquiring includes generating a depth map with pixel values representing distances of objects from the imaging device; and
the generating and outputting the data of the image of the user guide includes indicating on the image of the user guide a point cloud plotted by inversely projecting the pixels of the depth map to an object space.

5. The information processing apparatus according to claim 1, wherein the generating and outputting the data of the image of the user guide includes indicating on the image of the user guide a play area set up as a range in which the user is to stay.

6. The information processing apparatus according to claim 5, wherein settings of the play area are switched in accordance with a predetermined factor, the generating and outputting the data of the image of the user guide includes indicating the play area corresponding to the settings on the image of the user guide.

7. The information processing apparatus according to claim 5, wherein the generating and outputting the data of the image of the user guide includes displaying the play area having a shape or a size which is changed or selected by the user.

8. The information processing apparatus according to claim 1, wherein:
the acquiring includes acquiring the position information about an object other than the user on the basis of an image captured by an imaging device; and
the generating and outputting the data of the image of the user guide includes indicating a position of the object other than the user on the image of the user guide.

9. The information processing apparatus according to claim 1, wherein the generating and outputting the data of the image of the user guide includes generating a bird's-eye view of the user and, in accordance with a direction of the user acquired by the acquiring, rotates the bird's-eye view.

10. The information processing apparatus according to claim 1, wherein the generating and outputting the data of the image of the user guide includes indicating on the image of the user guide a pictorial figure denoting an action to be taken by the user.

11. The information processing apparatus of claim 1, wherein:
the acquiring includes acquiring information about position and posture of a head of the user based on the position information about the head-mounted display;
the information processing includes using the information about the position and posture of the head of the user;
said image to be displayed defines a virtual world displayed from a point of view corresponding to the position and posture of the head of the user;
the generating and outputting the data of the image of the user guide includes generating the image of the user guide indicating position information about the user in the real space and a play area set up as a range in which the user is to stay, using the position information about the head-mounted display; and the play area is set to coincide with or be narrower than the camera angle of view of an imaging device for imaging the head-mounted display to acquire its position.

12. The information processing apparatus according to claim 1, wherein the generating and outputting the data of the image of the user guide includes indicating on the image of the user guide lines dividing an effective viewing angle of the user into equal parts and equidistant curves relative to the user.

13. The information processing apparatus according to claim 1, wherein the generating and outputting the data of the image of the user guide includes issuing a warning sound to be generated in accordance with a condition identified by the position information, by outputting audio data localized at a position corresponding to the condition.

14. The information processing apparatus according to claim 1, further comprising: transmitting to the head-mounted display the data of the image to be displayed and the data of the image of the user guide.

15. The information processing apparatus according to claim 1, wherein the user guide is superimposed on the virtual world.

16. The information processing apparatus according to claim 1, wherein the virtual world is displayed from a point of view corresponding to the position and posture of a head of the user.

17. The information processing apparatus according to claim 1, wherein the generating and outputting the data of the image of the user guide includes outputting an image which is captured by an imaging device as the user guide.

18. The information processing apparatus according to claim 1, wherein the generating and outputting the data of the image of the user guide includes displaying the user guide which points to the direction in which the user actually faces.

19. The information processing apparatus according to claim 1, wherein the generating and outputting the data of the image of the user guide includes softening a contour of the user guide.

20. The information processing apparatus according to claim 1, wherein acquiring position information about the head-mounted display is done by an imaging device which is attached to the head-mounted display.

21. A user guide presentation method for use with an information processing apparatus, the method comprising:
acquiring position information about a head-mounted display;
performing information processing using the position information about the head-mounted display;
generating and outputting data of an image to be displayed as a result of the information processing; and
generating and outputting data of an image of a user guide indicating position information about a user in a real space using the position information about the head-mounted display,
wherein the generating and outputting the data of the image of the user guide includes determining whether to display the user guide in response to a user operation.

22. A non-transitory, computer readable storage medium containing a computer program, which when executed by a computer, causes the computer to carry out actions, comprising:
acquiring position information about a head-mounted display;
performing information processing using the position information about the head-mounted display;
generating and outputting data of an image to be displayed as a result of the information processing; and
generating and outputting data of an image of a user guide indicating position information about a user in a real space using the position information about the head-mounted display,
wherein the generating and outputting the data of the image of the user guide includes determining whether to display the user guide in response to a user operation.

23. An information processing apparatus having a central processing unit operating under the control of computer software stored within a memory, such that the information processing apparatus carries out actions, comprising:
acquiring position information about a head-mounted display;
performing information processing using the position information about the head-mounted display;
generating and outputting data of an image to be displayed as a result of the information processing; and
generating and outputting data of an image of a user guide indicating position information about a user in a real space using the position information about the head-mounted display,
wherein the generating and outputting the data of the image of the user guide includes determining whether to display the user guide regardless of the user operation.

24. A user guide presentation method for use with an information processing apparatus, the method comprising:
acquiring position information about a head-mounted display;
performing information processing using the position information about the head-mounted display;
generating and outputting data of an image to be displayed as a result of the information processing; and
generating and outputting data of an image of a user guide indicating position information about a user in a real space using the position information about the head-mounted display,
wherein the generating and outputting the data of the image of the user guide includes determining whether to display the user guide regardless of the user operation.

25. A non-transitory, computer readable storage medium containing a computer program, which when executed by a computer, causes the computer to carry out actions, comprising:
acquiring position information about a head-mounted display;
performing information processing using the position information about the head-mounted display;
generating and outputting data of an image to be displayed as a result of the information processing; and
generating and outputting data of an image of a user guide indicating position information about a user in a real space using the position information about the head-mounted display,
wherein the generating and outputting the data of the image of the user guide includes determining whether to display the user guide regardless of the user operation.

* * * * *